United States Patent
Cheong et al.

(10) Patent No.: US 7,700,000 B2
(45) Date of Patent: Apr. 20, 2010

(54) SILICON DERIVATIVE, LIQUID CRYSTAL COMPOSITION COMPRISING THE SAME AND COMPENSATION FILM USING THE SAME LIQUID CRYSTAL COMPOSITION

(75) Inventors: Jae Ho Cheong, Daejeon (KR); Min Jin Ko, Daejeon (KR); Dae Ho Kang, Daejeon (KR); Ki Youl Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 373 days.

(21) Appl. No.: 11/602,315

(22) Filed: Nov. 21, 2006

(65) Prior Publication Data

US 2007/0114492 A1    May 24, 2007

(30) Foreign Application Priority Data

Nov. 23, 2005  (KR) .................. 10-2005-0112326

(51) Int. Cl.
 *C09K 19/00*  (2006.01)
 *C09K 19/06*  (2006.01)
 *C09K 19/52*  (2006.01)

(52) U.S. Cl. .................. 252/299.01; 252/299.6; 430/20; 430/270.1; 428/1.1

(58) Field of Classification Search ............ 252/299.01, 252/299.6; 428/1.1; 430/20, 270.1
See application file for complete search history.

(56) References Cited

U.S. PATENT DOCUMENTS 4,213,914 A * 7/1980 Bargain et al. .............. 556/419

FOREIGN PATENT DOCUMENTS

| JP | 10-114894 A | 5/1998 |
|---|---|---|
| JP | H11-29580 A | 2/1999 |
| JP | 2002-255974 A | 9/2002 |
| JP | 2002-265475 A | 9/2002 |

* cited by examiner

*Primary Examiner*—Geraldina Visconti
(74) *Attorney, Agent, or Firm*—McKenna Long & Aldridge LLP

(57) ABSTRACT

Disclosed are a silicon derivative, a liquid crystal composition comprising the same, and a compensation film for a liquid crystal display device using the same liquid crystal composition. More particularly, the silicon derivative is a liquid crystal material of a high-quality view angle compensation film, which improves a contrast ratio measured at a tilt angle when compared to a contrast ratio measured from the front surface and minimizes color variations in a black state depending on view angles.

11 Claims, 1 Drawing Sheet

SILICON DERIVATIVE, LIQUID CRYSTAL COMPOSITION COMPRISING THE SAME AND COMPENSATION FILM USING THE SAME LIQUID CRYSTAL COMPOSITION

This application claims the benefit of the filing date of Korean Patent Application No. 10-2005-0112326, filed on Nov. 23, 2005, in the Korean Intellectual Property Office, the disclosure of which is incorporated herein in its entirety by reference.

BACKGROUND OF THE INVENTION (a) Field of the Invention

The present invention relates to a silicon derivative, a liquid crystal composition comprising the same, and a compensation film for a liquid crystal display device using the same liquid crystal composition. More particularly, the present invention relates to a liquid crystal material of a high-quality view angle compensation film, which improves a contrast ratio measured at a tilt angle when compared to a contrast ratio measured from the front surface and minimizes color variations in a black state depending on view angles. The present invention also relates to a liquid crystal composition comprising the same liquid crystal material and a compensation film obtained from the same liquid crystal composition.

(b) Description of the Related Art

Recently, as watches, notebook PCs, cellular phones, televisions and monitors have extended the market, display devices having low weight and requiring low power consumption have been increasingly in demand. Since liquid crystal display devices (LCDs) are light and thin and require low power consumption, they have been widely applied to such products.

However, a liquid crystal display device has a disadvantage of view angle dependency. In other words, an LCD shows variations in color or light/darkness depending on view directions or angles. Additionally, as the screen of an LCD increases in size, view angle decreases more and more. As compared to a conventional CRT (cathode ray tube) device having a view angle of about 180°, a TFT-LCD with no view angle compensation shows a view angle of merely about ±50°.

To solve the above problem, various methods have been used, such methods including a multi-domain method in which pixels are divided in liquid crystal cells to control the liquid crystal alignment, a method of controlling a voltage and a method of utilizing an optical compensation film.

The above-mentioned view angle dependency of a liquid crystal display device is caused by the incident light having a tilt angle to the LCD panel, which shows a birefringence effect different from that of the vertical incident light. To compensate for this, an optical compensation film has been widely used. Herein, retardation films having an opposite birefringence index to the panel are attached onto both surfaces of the panel. Also, as display panels have increased in size, there has been a need for a high-quality liquid crystal compensation film.

A retardation film is obtained by coating an aligned transparent support with liquid crystal, and aligning the liquid crystal along a predetermined direction to the direction of an aligning layer, followed by curing. After aligning, the liquid crystal has a direction opposite to the direction of liquid crystal cells upon application of a voltage, so that light leakage in a black state can be minimized. When combining such retardation films with a liquid crystal panel and light is allowed to penetrate through the panel, it is possible to compensate for a retardation of light caused by a difference of light paths, because the incident light has a similar path in all directions. Additionally, it is also possible to perform compensation of a difference in birefringence indexes in all directions by optimizing a birefringence latitude of each film, an angle formed between films, a rubbing direction and an angle to a polarizer.

A liquid crystal compound used to manufacture such films should be stable against moisture, light, heat, air, electric fields, or the like. Also, the liquid crystal compound should be chemically stable under an environment of use. Further, in order to apply a liquid crystal compound to a display device, the compound should have adequately balanced physical properties, including a broad range of liquid crystal phase temperatures and refraction anisotropy ($\Delta n$). Under these circumstances, there is a need for a novel liquid crystal compound satisfying various physical properties required for various types of display devices.

SUMMARY OF THE INVENTION

Therefore, the present invention has been made in view of the above-mentioned problems. It is an object of the present invention to provide a novel silicon derivative useful as a material for a view angle compensation film that can improve a contrast ratio and minimize variations in color depending on view angles in a black state.

It is another object of the present invention to provide a liquid crystal composition comprising the above silicon derivative, and a compensation film for liquid crystal display device using the above liquid crystal composition.

According to an aspect of the present invention, there is provided a novel silicon derivative. Also, the present invention provides a liquid crystal composition comprising the above silicon derivative, and a compensation film for liquid crystal display device using the same.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Figure 1:
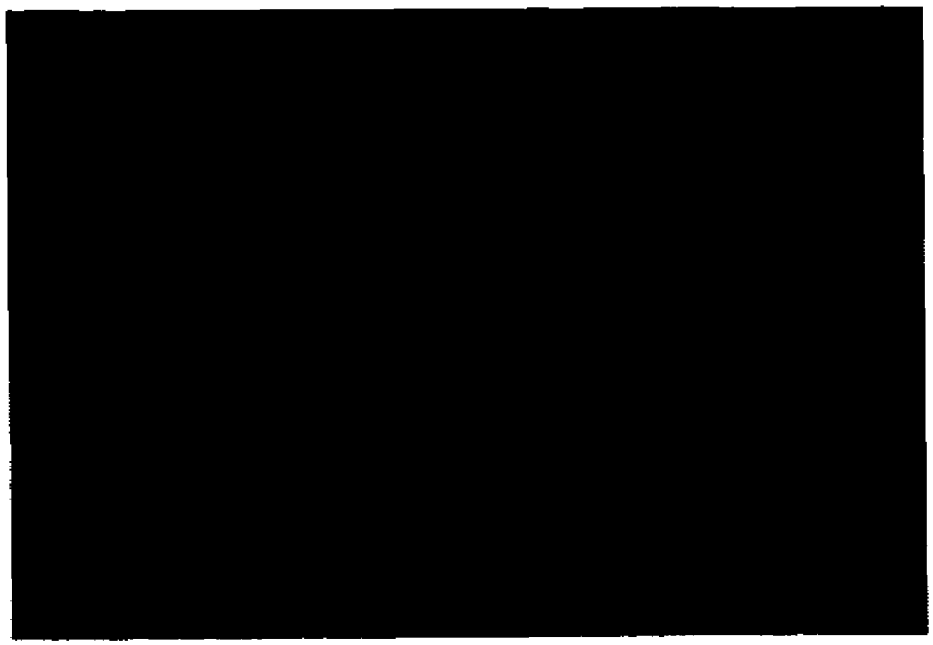
FIG. 1 is a photographic view taken by a polarizing microscope, which shows a liquid crystal display using a compensation film according to a preferred embodiment of the present invention in a black state.
Figure 2:
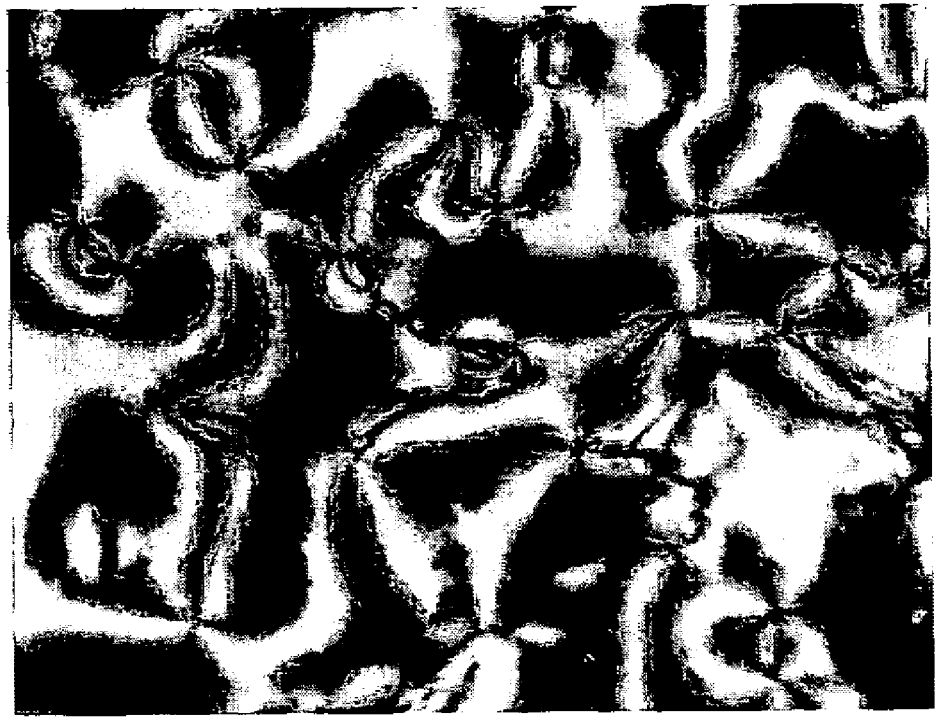
FIG. 2 is a photographic view taken by a polarizing microscope, which shows a nematic liquid crystal phase of the liquid crystal composition according to a preferred embodiment of the present invention.

Hereinafter, the present invention will be explained in more detail.

The novel silicon derivative according to the present invention is represented by the following Formula 1:

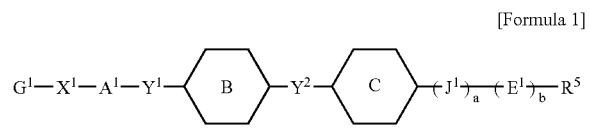

[Formula 1]

wherein $G^1$ is

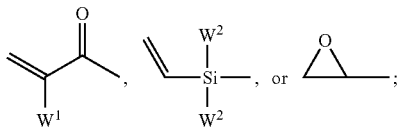

$E^1$ is

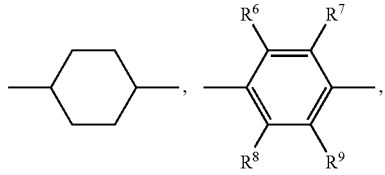

each of $W^1$ and $W^2$ independently represents —H, —CH$_3$, —CH$_2$CH$_3$, —F, —Cl, —Br or —CF$_3$;

$X^1$ is —O—, —NH— or —(CH$_2$)$_m$—, and m is an integer of 0~5;

$A^1$ is a $C_1$~$C_{12}$ alkylene, $C_2$~$C_{12}$ alkenylene, —(CH$_2$CH$_2$O)$_n$—, —(CH$_2$CHCH$_3$O)$_n$— or —(CHCH$_3$CH$_2$O)$_n$—, and n is an integer of 1~5;

each of $Y^1$ and $Y^2$ independently represents —O—, —NH—, —(CH$_2$)$_p$—, —CH=CH—, —C≡C—, —C(=O)O—, —OC(=O)—, —C(=O)—, —SiH$_2$—, —SiMe$_2$-, —SiEt$_2$-, —CH$_2$SiH$_2$—, —CH$_2$SiMe$_2$-, —CH$_2$SiEt$_2$-, —SiH$_2$CH$_2$—, —SiMe$_2$CH$_2$— or —SiEt$_2$CH$_2$—, and p is an integer of 0~2;

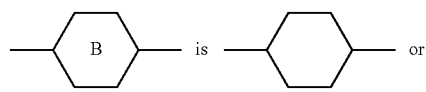

each of a and b independently represents an integer of 0~2;

each of $Q^1$~$Q^4$, $R^1$~$R^4$ and $R^6$~$R^9$ independently represents —H, —F, —Cl, —Br, —I, —CN, —OH, —CH$_3$, —CH$_2$CH$_3$ or —C(=O)CH$_3$; and $R^5$ is —SiMe$_3$, —SiEt$_3$, —SiF$_3$, —H, —F, —Cl, —Br, —I, —CF$_3$, —CN, —OH, —OCH$_3$, —OCH$_2$CH$_3$, —OCF$_3$, a $C_1$~$C_{12}$ alkyl or a $C_2$~$C_{12}$ alkenyl;

with the proviso that the compound of Formula 1 has at least one —Si—.

In addition, the novel compound according to the present invention is a silicon derivative represented by the following Formula 2:

[Formula 2]

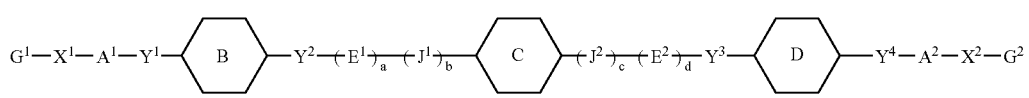

-continued

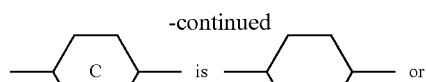

$J^1$ is —CH$_2$SiH$_2$—, —CH$_2$SiMe$_2$-, —CH$_2$SiEt$_2$-, —SiH$_2$CH$_2$—, —SiMe$_2$CH$_2$— or —SiEt$_2$CH$_2$—;

wherein each of $G^1$ and $G^2$ independently represents

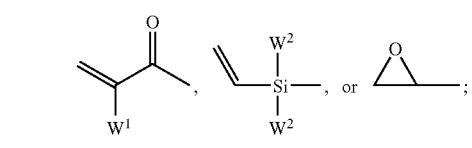

each of $W^1$ and $W^2$ independently represents —H, —CH$_3$, —CH$_2$CH$_3$, —F, —Cl, —Br or —CF$_3$;

each of $X^1$ and $X^2$ independently represents —O—, —NH— or —(CH$_2$)$_m$—, and m is an integer of 0~5;

each of $A^1$ and $A^2$ independently represents a $C_1$~$C_{12}$ alkylene, $C_2$~$C_{12}$ alkenylene, —$(CH_2CH_2O)_n$—, —$(CH_2CHCH_3O)_n$— or —$(CHCH_3CH_2O)_n$—, and n is an integer of 1~5;

each of $Y^1$~$Y^4$ independently represents —O—, —NH—, —$(CH_2)_p$—, —CH=CH—, —C≡C—, —C(=O)O—, —OC(=O)—, —C(=O)—, —SiH$_2$—, —SiMe$_2$-, —SiEt$_2$-, —CH$_2$SiH$_2$—, —CH$_2$SiMe$_2$-, —CH$_2$SiEt$_2$-, —SiH$_2$CH$_2$—, —SiMe$_2$CH$_2$— or —SiEt$_2$CH$_2$—, and p is an integer of 0~2;

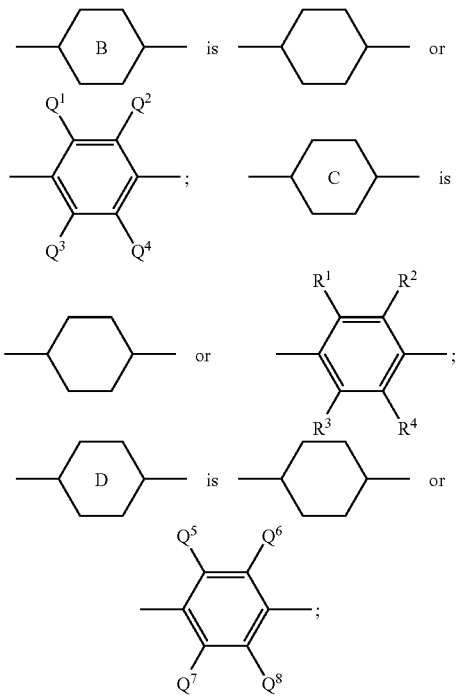

each of $J^1$ and $J^2$ independently represents —CH$_2$SiH$_2$—, —CH$_2$SiMe$_2$-, —CH$_2$SiEt$_2$-, —SiH$_2$CH$_2$—, —SiMe$_2$CH$_2$— or —SiEt$_2$CH$_2$—;

each of $E^1$ and $E^2$ independently represents

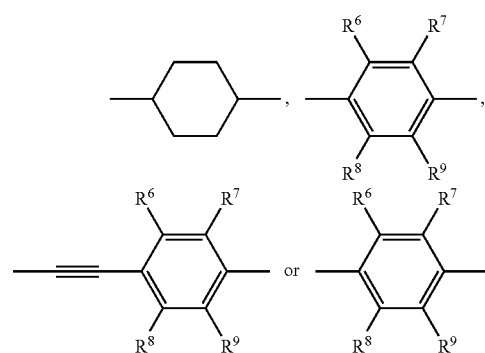

each of a, b, c and d independently represents an integer of 0~2; and each of $Q^1$~$Q^8$, $R^1$~$R^4$ and $R^6$~$R^9$ independently represents —H, —F, —Cl, —Br, —I, —CN, —OH, —CH$_3$, —CH$_2$CH$_3$ or —C(=O)CH$_3$;

with the proviso that the compound of Formula 2 has at least one —Si—.

The silicon derivatives represented by Formula 1 and Formula 2 are liquid crystal compounds applicable to a compensation film for liquid crystal display device, which improves view angles of various display devices.

In the silicon derivative represented by Formula 1, non-limiting examples of the $C_2$~$C_{12}$ alkenylene as $A^1$ include —CH=CH—, —CH=CCH$_3$—, —CH$_2$CH=CH—, —CH=CHCH$_2$CH$_2$—, —CH$_2$CH=CHCH$_2$—, —CH$_2$CH$_2$CH=CH—, —CH=CHCH$_2$CH$_2$CH$_2$—, —CH$_2$CH=CHCH$_2$CH$_2$—, —CH$_2$CH$_2$CH=CHCH$_2$—, —CH$_2$CH$_2$CH$_2$CH=CH—, or the like. Additionally, non-limiting examples of the $C_2$~$C_{12}$ alkenyl as $R^5$ include —CH=CH$_2$, —CH=CHCH$_3$, —CH$_2$CH=CH$_2$, —CH=CHCH$_2$CH$_3$, —CH$_2$CH=CHCH$_3$, —CH$_2$CH$_2$CH=CH$_2$, —CH=CHCH$_2$CH$_2$CH$_3$, —CH$_2$CH=CHCH$_2$CH$_3$, —CH$_2$CH$_2$CH=CHCH$_3$, —CH$_2$CH$_2$CH$_2$CH=CH$_2$, or the like.

In the silicon derivative represented by Formula 2, the $C_2$~$C_{12}$ alkenylene groups as $A^1$ and $A^2$ are independent from each other, and non-limiting examples of the $C_2$~$C_{12}$ alkenylene include —CH=CH—, —CH=CCH$_3$—, —CH$_2$CH=CH—, —CH=CHCH$_2$CH$_2$—, —CH$_2$CH=CHCH$_2$—, —CH$_2$CH$_2$CH=CH—, —CH=CHCH$_2$CH$_2$CH$_2$—, —CH$_2$CH=CHCH$_2$CH$_2$—, —CH$_2$CH$_2$CH=CHCH$_2$—, —CH$_2$CH$_2$CH$_2$CH=CH—, or the like.

In one preferred embodiment of the silicon derivative represented by Formula 1, $G^1$ may be vinylsilyl, $A^1$ may be a $C1$~$C_{12}$ alkylene, ring B and ring C may be aromatic rings, and $Q^1$~$Q^4$ may be H. Such a silicon derivative may be represented by the following Formula 3:

[Formula 3]

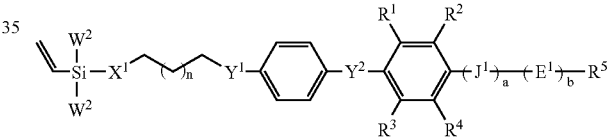

wherein $W^2$, $X^1$, $Y^1$, $Y^2$, $J^1$, $E^1$, a, b and $R^1$~$R^5$ are the same as defined in above Formula 1; and n is an integer of 0~10.

In another preferred embodiment of the silicon derivative represented by Formula 1, $G^1$ may be acryl, $A^1$ may be a $C_1$~$C_{12}$ alkylene, ring B and ring C may be aromatic rings, and $Q^1$~$Q^4$ may be H. Such a silicon derivative may be represented by the following Formula 4:

[Formula 4]

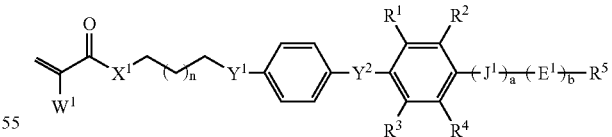

wherein $W^1$, $X^1$, $Y^1$, $Y^2$, $J^1$, $E^1$, a, b and $R^1$~$R^5$ are the same as defined in the above Formula 1; and n is an integer of 0~10, with the proviso that the compound represented by Formula 4 contains at least one —Si—.

In one preferred embodiment of the silicon derivative represented by Formula 2, each of $G^1$ and $G^2$ may be vinylsilyl, each of $A^1$ and $A^2$ may be a $C1$~$C_{12}$ alkylene, ring B, ring C and ring D may be aromatic rings, and $Q^1$~$Q^8$ may be H. Such a silicon derivative may be represented by the following Formula 5:

[Formula 5]

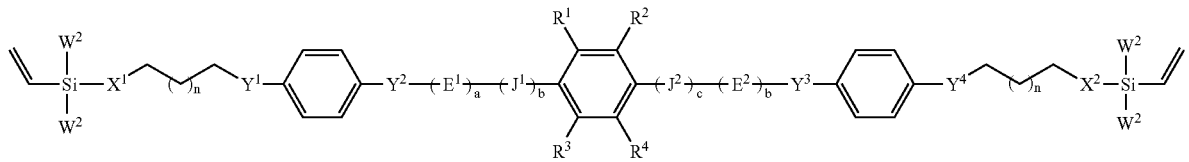

wherein $W^2$, $X^1$, $X^2$, $Y^1$~$Y^4$, $J^1$, $J^2$, $E^1$, $E^2$, a, b, c, d and $R^1$~$R^4$ are the same as defined in the above Formula 2; and n is an integer of 0~10.

In another preferred embodiment of the silicon derivative represented by Formula 2, each of $G^1$ and $G^2$ may be acryl, each of $A^1$ and $A^2$ may be a C1~$C_{12}$ alkylene, ring B, ring C and ring D may be aromatic rings, and $Q^1$~$Q^8$ may be H. Such a silicon derivative may be represented by the following Formula 6:

[Formula 6]

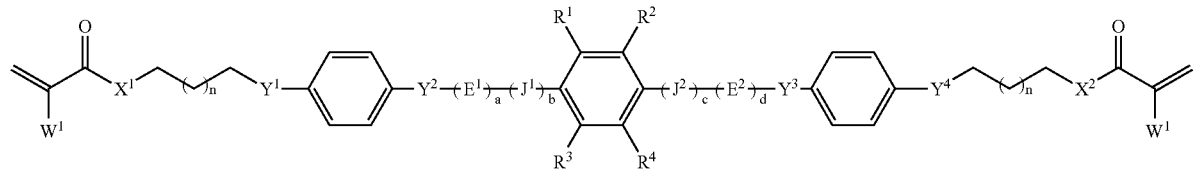

wherein $W^1$, $X^1$, $X^2$, $Y^1$~$Y^4$, $J^1$, $J^2$, $E^1$, $E^2$, a, b, c, d and $R^1$~$R^4$ are the same as defined in the above Formula 2; and n is an integer of 0~10, with the proviso that the compound represented by Formula 6 contains at least one —Si—.

In still another preferred embodiment of the silicon derivative represented by Formula 2, $G^1$ may be acryl, $G^2$ may be vinylsilyl, each of $A^1$ and $A^2$ may be a C1~$C_{12}$ alkylene, ring B, ring C and ring D may be aromatic rings, and $Q^1$~$Q^8$ may be H. Such a silicon derivative may be represented by the following Formula 7:

[Formula 7]

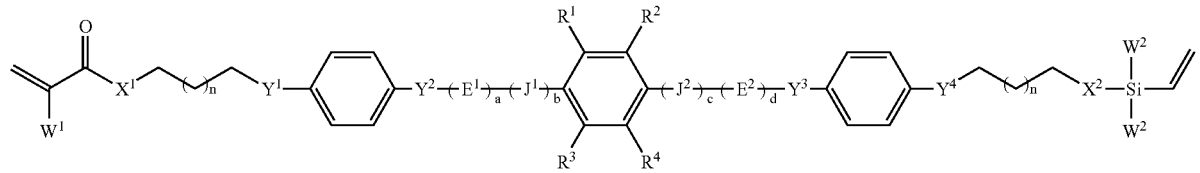

wherein $W^1$, $W^2$, $X^1$, $X^2$, $Y^1$~$Y^4$, $J^1$, $J^2$, $E^1$, $E^2$, a, b, c, d and $R^1$~$R^4$ are the same as defined in the above Formula 2; and n is an integer of 0~10.

Particular examples of the silicon derivatives represented by Formula 1 and Formula 2 include the following compounds, but the scope of the present invention is not limited thereto:

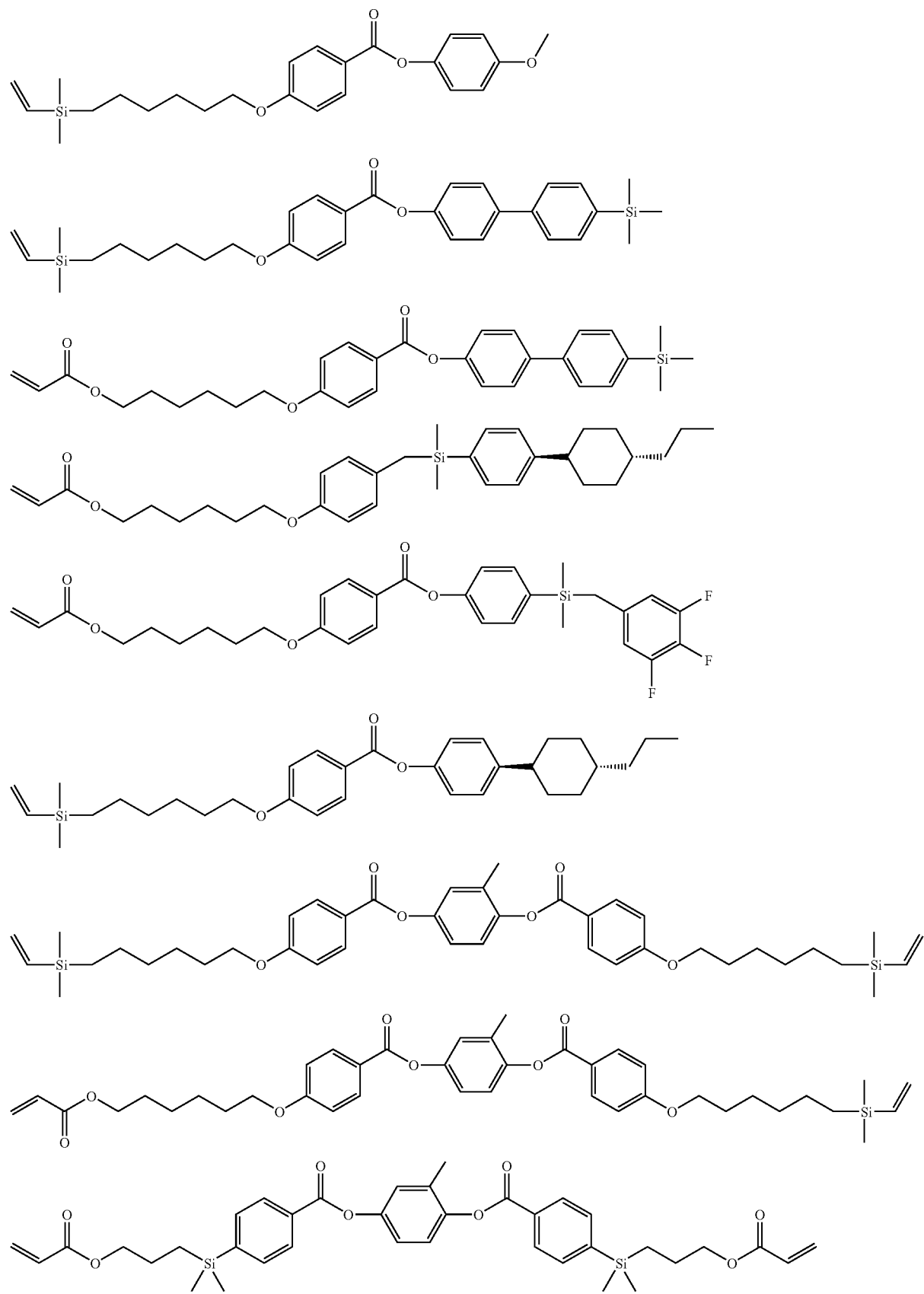

-continued

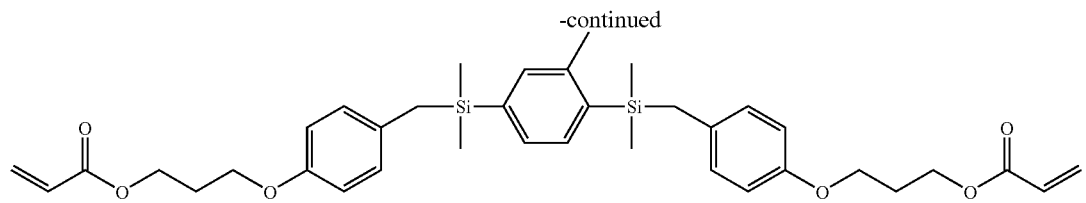

According to the present invention, the silicon derivative represented by Formula 1 may have stereoisomers, if $A^1$ is alkenylene, or ring B, ring C and/or $E^1$ is cyclohexylene. Herein, the silicon derivative having stereoisomers is preferably present in a trans-form with liquid crystal characteristics. Additionally, stereoisomers of the silicon derivative may be present in a ratio of trans-isomer:cis-isomer of 85:15~100:0.

Also, the silicon derivative represented by Formula 2 may have stereoisomers, if $A^1$ and/or $A^2$ are/is alkenylene, or ring B, ring C, ring D, $E^1$ and/or $E^2$ is cyclohexylene. Herein, the silicon derivative having stereoisomers is preferably present in a trans-form with liquid crystal characteristics. Additionally, stereoisomers of the silicon derivative may be present in a ratio of trans-isomer: cis-isomer of 85:15~100:0.

Hereinafter, methods for preparing the silicon derivative according to the present invention will be explained in more detail.

The silicon derivative according to the present invention, represented by the following Formula 10, may be prepared by way of the following Reaction Scheme 1:

[Reaction Scheme 1]

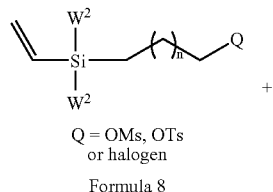

Q = OMs, OTs or halogen

Formula 8

+

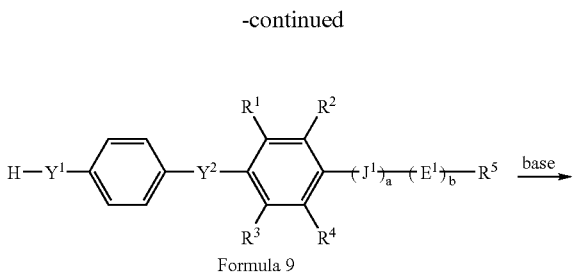

Formula 9

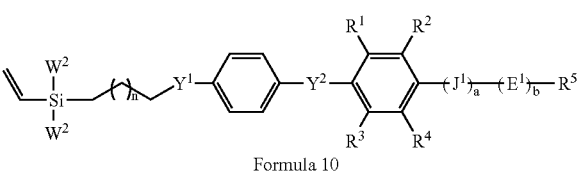

Formula 10 wherein $W^2, Y^1, Y^2, J^1, E^1$, a, b and $R^1$~$R^5$ are the same as defined in the above Formula 1, and n is an integer of 0~10.

Additionally, the silicon derivative according to the present invention, represented by the following Formula 11, may be prepared by way of the following Reaction Scheme 2:

[Reaction Scheme 2]

2 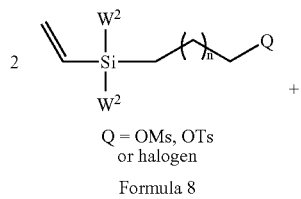

Q = OMs, OTs or halogen

Formula 8

+

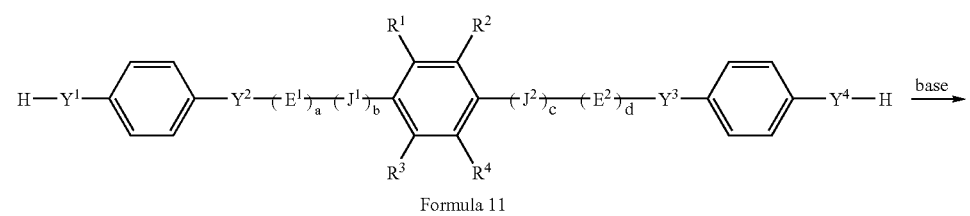

Formula 11

-continued

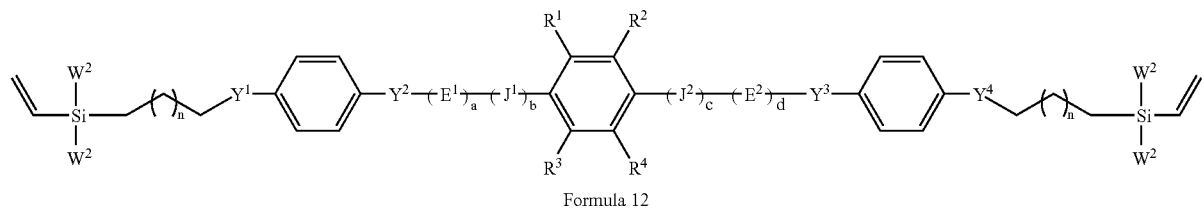
Formula 12 wherein $W^2$, $Y^1$~$Y^4$, $J^1$, $J^2$, $E^1$, $E^2$, a, b, c, d and $R^1$~$R^4$ are the same as defined in the above Formula 2, and n is an integer of 0~10.

In Reaction Schemes 1 and 2, a weak base such as $K_2CO_3$ may be used as a base.

The vinylsilyl compound of Formula 8 used in the above Reaction Schemes 1 and/or 2 may be prepared by way of the following Reaction Scheme 3:

wherein $W^2$ is the same as defined in the above Formula 1, and n is an integer of 0~10.

More particularly, the compound of Formula 8 may be obtained via hydrosilylation followed by Grignard reaction. Alternatively, the compound of Formula 8 may be obtained by introducing a vinylsilyl group via hydrosilylation or Grignard reaction, deprotecting the vinylsilyl group, and carrying out mesylation, tosylation or halogenation.

[Reaction Scheme 3]

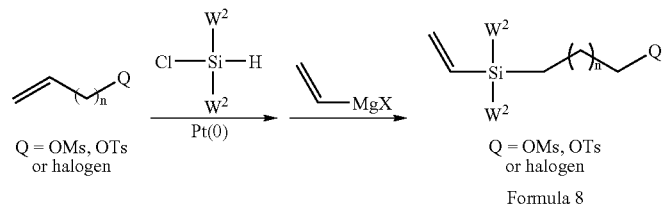
Formula 8

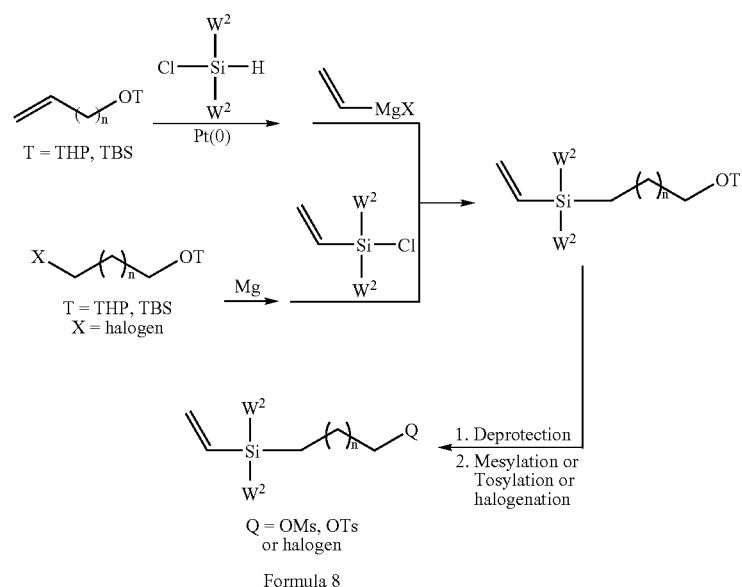
Formula 8

Further, the silicon derivative according to the present invention, represented by the following Formula 14, may be prepared by way of the following Reaction Scheme 4:

[Reaction Scheme 4]

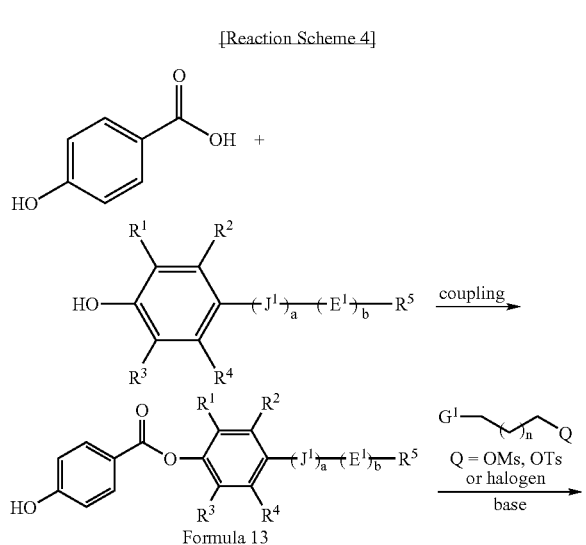

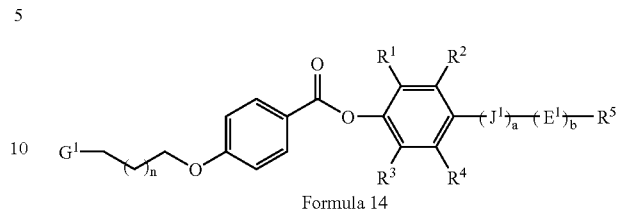

Formula 14 wherein $G^1$, $J^1$, $E^1$, a, b and $R^1 \sim R^5$ are the same as defined in the above Formula 1, and n is an integer of 0~10, with the proviso that the compound of Formula 14 contains at least one —Si—.

In Reaction Scheme 4, the compound represented by Formula 13 may be prepared from an acid and an alcohol by way of Dean-Stark reaction.

Further, the silicon derivative represented by Formula 16 may be prepared by way of the following Reaction Scheme 5:

[Reaction Scheme 5]

Formula 15

Formula 16 wherein G is G¹ or G², R¹~R⁴ are the same as defined in the above Formula 2, and n is an integer of 0~10, with the proviso that the compound of Formula 15 contains at least one —Si—.

In Reaction Scheme 5, the compound represented by Formula 15 may be prepared from an acid and an alcohol by way of Dean-Stark reaction, and the ester compound represented by Formula 15 is allowed to react with an acrylic linker or vinylsilyl linker in the presence of a base such as $K_2CO_3$ to obtain the silicon derivative represented by Formula 16.

Methods for preparing the silicon derivatives according to the present invention also include other methods performed via a reaction path similar to Reaction Schemes 1~5.

The silicon derivative obtained as described above is well mixed with various liquid crystal materials and shows a high solubility even at low temperatures.

Additionally, the silicon derivative according to the present invention is physically and chemically stable and is stable against heat and light, under the application conditions of conventional liquid crystal display devices, and forms a liquid crystal mesophase at a preferred range of temperatures. Therefore, the silicon derivative according to the present invention is very useful for forming a liquid crystal composition.

Accordingly, the present invention also provides a liquid crystal composition comprising at least one silicon derivative selected from the group consisting of the silicon derivatives represented by Formula 1 and Formula 2.

Each silicon derivative is used in the liquid crystal composition in an amount of 0.1~99.9 wt %, preferably of 1~80 wt %, based on the total weight of the composition.

The liquid crystal composition according to the present invention may further comprise other liquid crystal compounds currently used in the conventional liquid crystal composition in addition to the above silicon derivative. Such compounds may be used at various ratios as desired.

Additionally, the liquid crystal composition according to the present invention may further comprise suitable additives, if necessary. Non-limiting examples of such additives include a chiral dopant or a leveling agent that inhibits a spiral structure of liquid crystal or reverse distortion of liquid crystal.

The liquid crystal composition according to the present invention may be prepared in a conventional manner. Typically, various components for forming the liquid crystal composition are dissolved at room temperature or high temperature.

Further, the present invention provides a compensation film for liquid crystal display device, which comprises the silicon derivative or the liquid crystal composition according to the present invention.

Particular examples of the compensation film for liquid crystal display device include A-plate type compensation films, B-plate type compensation films, (+)C-plate type compensation films, (−)C-plate type compensation films, or the like.

Reference will now be made in detail to the preferred embodiments of the present invention. However, the following examples are illustrative only, and the scope of the present invention is not limited thereto.

EXAMPLE 1

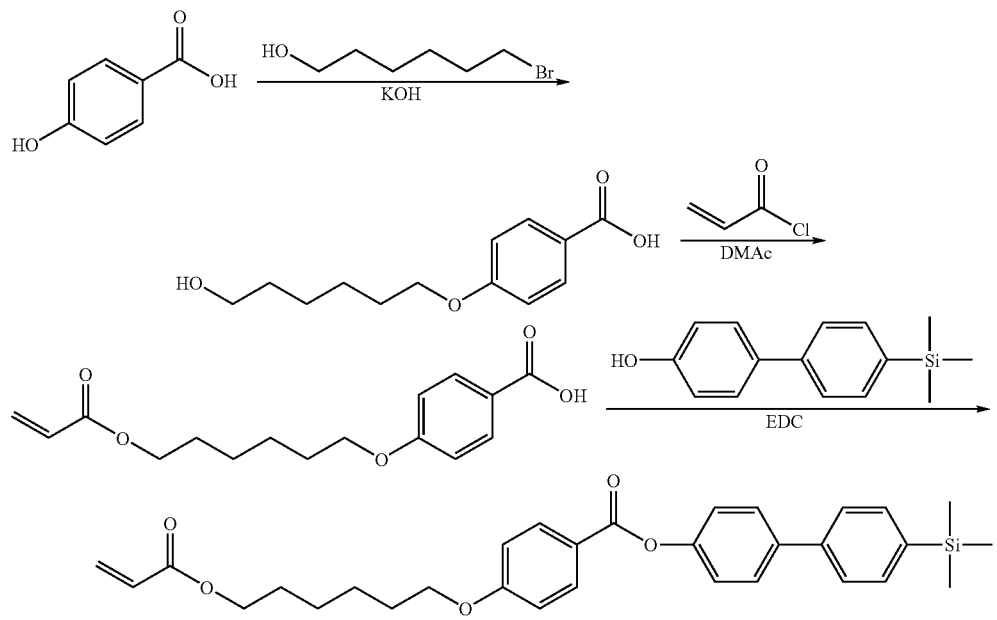

First, 4-hydroxybenzoic acid and 6-bromo-1-hexanol were added to a mixed solvent of water : methanol (1:1) in a mole ratio of 1:1. To the resultant mixture, 2.0 equivalents of KOH were added, and the mixture was heated at 100° C. for 10 hours. The reaction mixture was subjected to distillation under reduced pressure to remove solvent, thereby providing a pale yellow solid. The solid was washed with water and hexane to obtain a hydroxyacid at a yield of about 90% as a white solid. Next, 1.0 equivalent of the hydroxyacid solid was dissolved in DMAc as a solvent, and 1.2 equivalents of acryloyl chloride was added dropwisely thereto at low temperature. After carrying out reaction at room temperature for about 1 hour, the reaction mixture was worked up with ether and water, and the organic solvent was removed to obtain a yellow solid. The solid was washed with hexane to obtain a white solid at a yield of 86%. Then, 1.0 equivalent of the above solid and 1.0 equivalent of the above phenolic compound were dissolved in $CH_2Cl_2$ as a solvent, and 1.2 equivalents of EDC and a small amount of DMAP were added thereto. The reaction mixture was stirred at room temperature for about 10 hours, and treated with silica to obtain the final compound at a yield of 87%. $^1$HNMR (400 MHz, $CDCl_3$): δ 0.32 (s, 9H), 1.46~1.57 (m, 4H), 1.71~1.78 (m, 2H), 1.82~1.95 (m, 2H), 4.07 (t, 2H), 4.20 (t, 2H), 5.85 (d, 1H), 6.17 (dd, 1H), 6.39 (d, 1H), 6.98 (d, 2H), 7.27 (d, 2H), 7.60~7.66 (m, 5H), 8.17 (d, 2H).

EXAMPLE 2

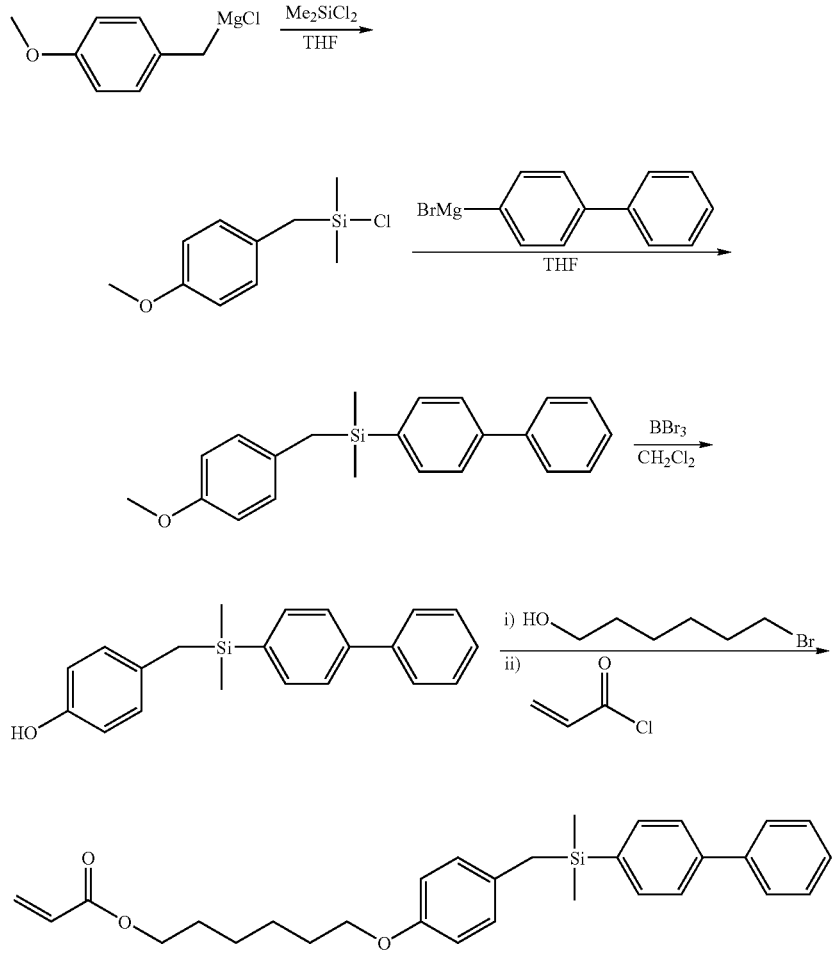

First, 4-methoxybenzylmagnesium bromide in THF solution was cooled to −30° C., 2.0 equivalents of dichlorodimethylsilane was added dropwisely thereto, and the reaction mixture was warmed gradually to room temperature. After carrying out reaction at room temperature for about 10 hours, the reaction mixture was subjected to distillation under reduced pressure to remove the solvent and the remaining silicon compound. Next, hexane was added thereto to cause a white magnesium salt to precipitate, and the salt was filtered. Then, the organic solvent was completely removed from the salt, and the resultant product was allowed to react with a Grignard reagent, formed from 4-bromobiphenyl and Mg, in THF as a solvent. After completing reaction for about 10 hours under heating, the reaction mixture was worked up with ether and 10% HCl, and was treated and separated with silica gel to obtain a desired compound at a yield of about 80%. Then, 1.0 equivalent of the compound was dissolved in $CH_2Cl_2$ as a solvent, 1.2 equivalents of $BBr_3$ was gradually added dropwise thereto at 0° C., and reaction was carried out at room temperature for an additional 1 hour. The reaction mixture was separated with silica gel to obtain a desired alcohol compound at a yield of 76%. Then, 1.0 equivalent of the above alcohol compound and 1.2 equivalents of 6-bromo-1-hexanol were dissolved in butanone, 1.2 equivalents of $K_2CO_3$ was added thereto, and the resultant mixture was stirred at 80° C. for about 10 hours. After the stirred mixture was separated with silica gel to obtain a desired compound at a yield of about 80%, 1.0 equivalent of the above compound was dissolved in DMAc as a solvent, and 1.2 equivalents of acryloyl chloride was added thereto. The resultant mixture was stirred at room temperature for about 1 hour, worked up with ether and water, and separated with silica gel to obtain the final silicon liquid crystal compound at a yield of 83%. $^1$HNMR (400 MHz, $CDCl_3$): δ 0.32 (s, 6H), 1.46~1.57 (m, 4H), 1.71~1.78 (m, 2H), 1.80~1.91 (m, 2H), 2.30 (s, 2H), 3.96 (t, 2H), 4.21 (t, 2H), 5.83 (d, 1H), 6.16 (dd, 1H), 6.45 (d, 1H), 6.79 (d, 2H), 6.91 (d, 2H), 7.48 (t, 1H), 7.56 (t, 2H), 7.60~7.84 (m, 6H).

EXAMPLE 3

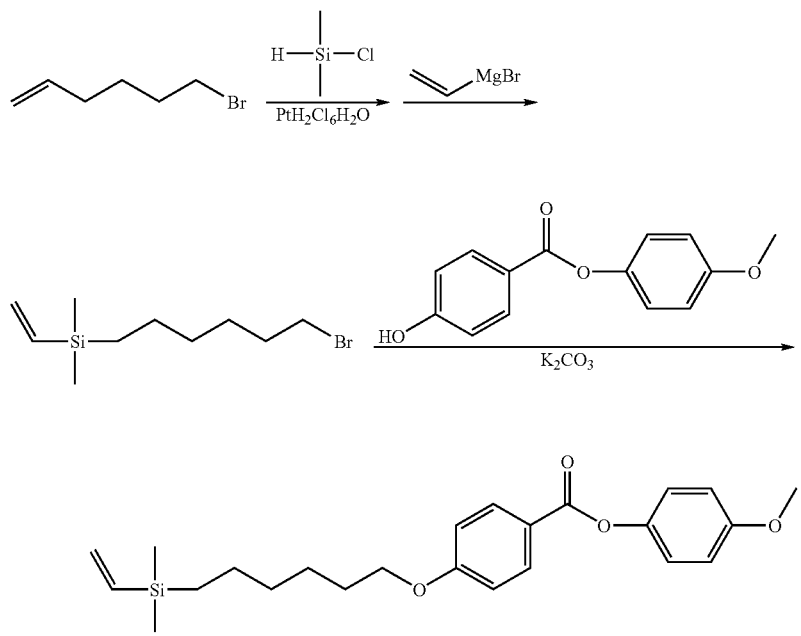

30

First, 1.0 equivalent of 1-bromo-5-hexene was mixed with 5.0 equivalents of dimethylchlorosilane, a small amount of $PtH_2Cl_6H_2O$ was added thereto, the reaction mixture was allowed to react at 65° C. for 10 hours, and then the remaining dimethylchlorosilane was removed. To the resultant reaction mixture, dry THF solvent was added, and 1.0 equivalent of vinylmagnesium bromide was gradually added thereto. The reaction mixture was stirred at room temperature for 10 hours. After the completion of the reaction, the reaction mixture was worked up with hexane and water, and then purified with silica gel to obtain a vinylsilyl linker at a yield of 90%.

Then, 1.0 equivalent of the above compound (vinylsilyl linker) was dissolved in butanone, 1.0 equivalent of the methoxyphenyl ester and 1.2 equivalents of $K_2CO_3$ were added thereto. The reaction mixture was allowed to react at 80° C. for about 10 hours and purified with silica to obtain the final silicon derivative at a yield of 89%. $^1$HNMR (400 MHz, $CDCl_3$): δ 0.09 (s, 6H), 0.58~0.64 (m, 2H), 1.32~1.59 (m, 6H), 1.78~1.89 (m, 2H), 3.83 (s, 3H), 4.05 (t, 2H), 5.69 (dd, 1H), 5.98 (dd, 1H), 6.18 (dd, 1H), 6.92~6.99 (m, 4H), 7.15 (d, 2H), 8.15 (d, 2H).

EXAMPLE 4

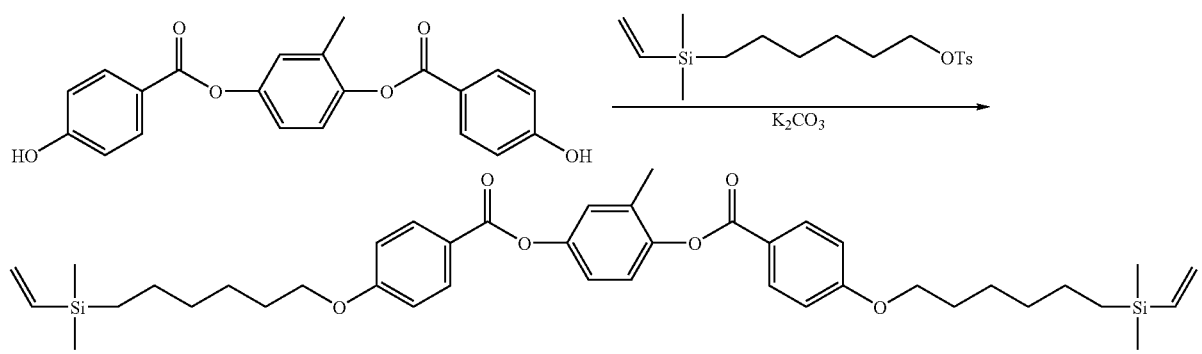

60

First, 1.0 equivalent of di-ester obtained from Dean-Stark reaction was dissolved in butanone as a solvent. Next, 2.0 equivalents of the vinylsilyl linker and 2.2 equivalents of $K_2CO_3$ were added thereto and the reaction mixture was stirred at 80° C. for about 10 hours. The reaction mixture was worked up with ether and water and the organic solvent was removed from the reaction mixture to obtain a solid. The resultant solid was washed with ether many times to obtain the final silicon derivative as a white solid at a yield of 80%. $^1$HNMR (400 MHz, $CDCl_3$): δ 0.09 (s, 12H), 0.56~0.66 (m, 4H), 1.30~1.59 (m, 12H), 1.78~1.90 (m, 4H), 2.24 (s, 3H), 4.04 (t, 4H), 5.68 (dd, 2H), 5.99 (dd, 2H), 6.18 (dd, 2H), 6.92~6.99 (m, 4H), 7.07 (dd, 1H), 7.15 (d, 1H), 7.19 (d, 1H), 8.16~8.20 (m, 4H).

EXAMPLE 5

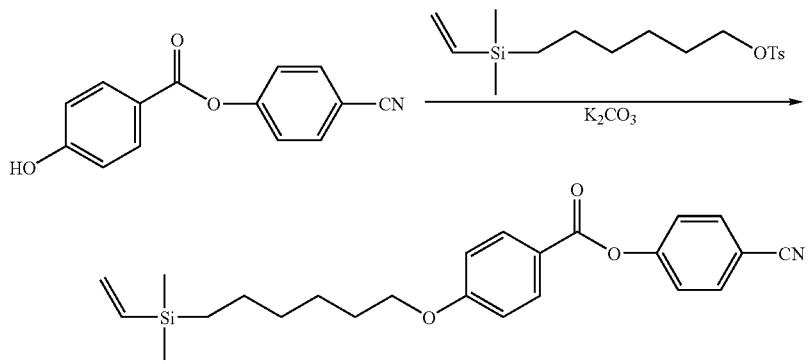

First, 1.0 equivalent of the cyanoester and 1.0 equivalent of a vinylsilyl linker were dissolved in butanone as a solvent. Next, 1.2 equivalents of $K_2CO_3$ was added thereto and the reaction mixture was stirred at 80° C. for about 10 hours. The resultant mixture was worked up with ether and water and purified with silica to obtain the final silicon derivative at a yield of 88%. $^1$HNMR (400 MHz, $CDCl_3$): δ 0.09 (s, 6H), 0.56~0.64 (m, 2H), 1.32~1.58 (m, 6H), 1.80~1.91 (m, 2H), 4.05 (t, 2H), 5.68 (dd, 1H), 5.97 (dd, 1H), 6.16 (dd, 1H), 6.99 (d, 2H), 7.32 (d, 2H), 7.76 (d, 2H), 8.14 (d, 2H).

EXAMPLE 6

Liquid Crystal Composition 1

Liquid Crystal Composition 1 was prepared by using the following components:

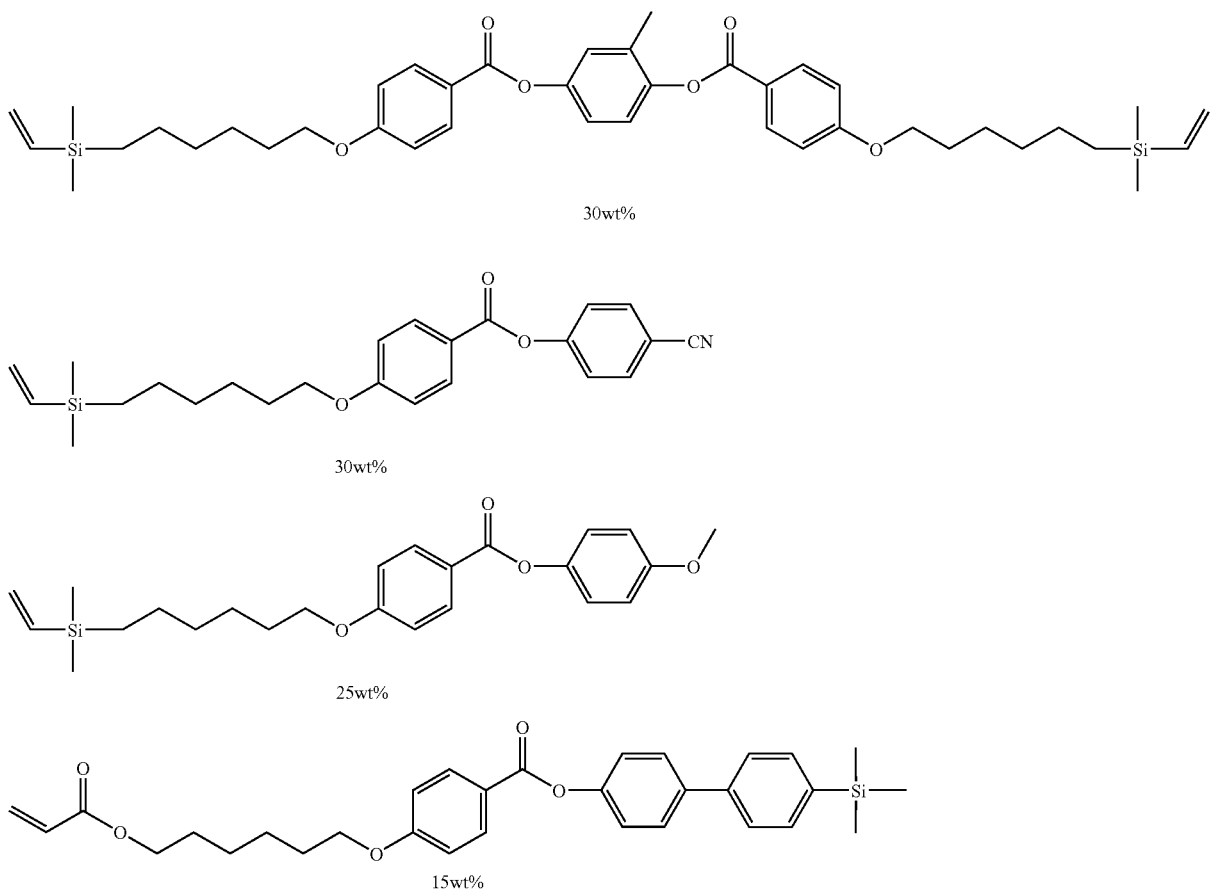

EXAMPLE 7
Liquid Crystal Composition 2
Liquid Crystal Composition 2 was prepared by using the following components:
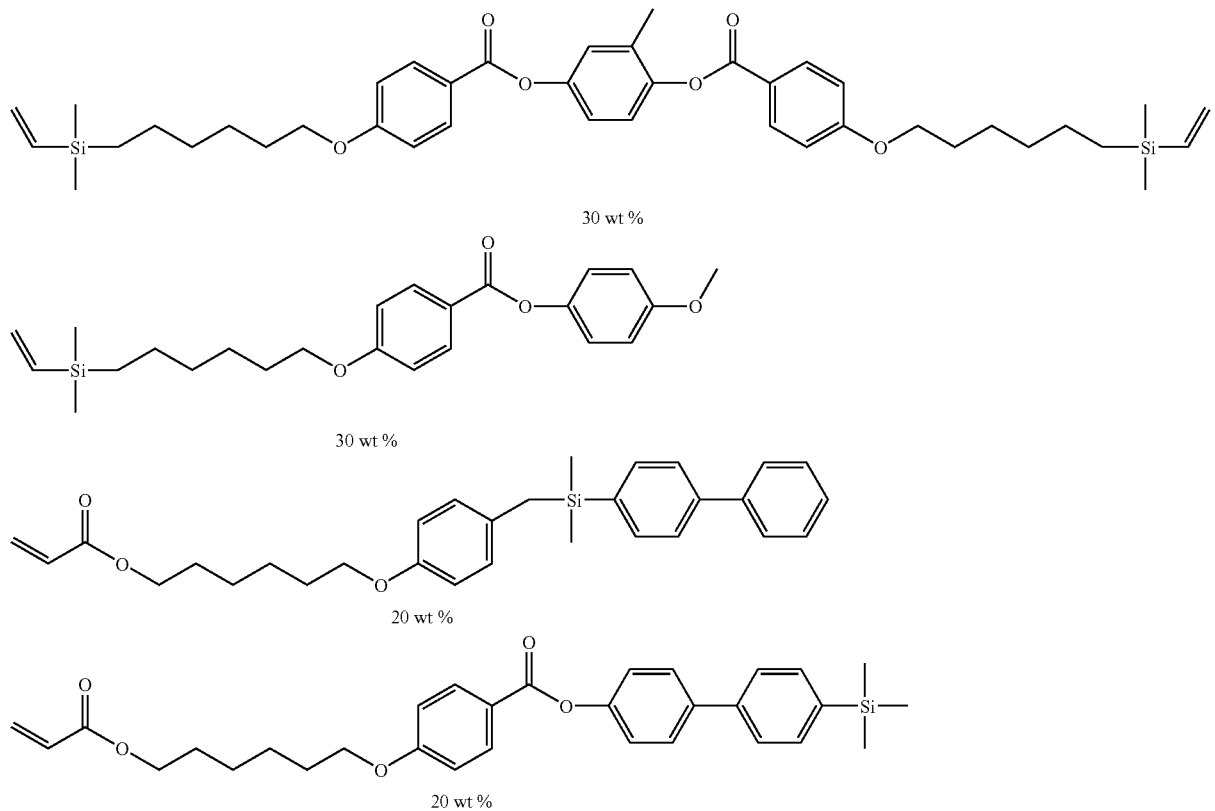
EXAMPLE 8
Liquid Crystal Composition 3
Liquid Crystal Composition 3 was prepared by using the following components:
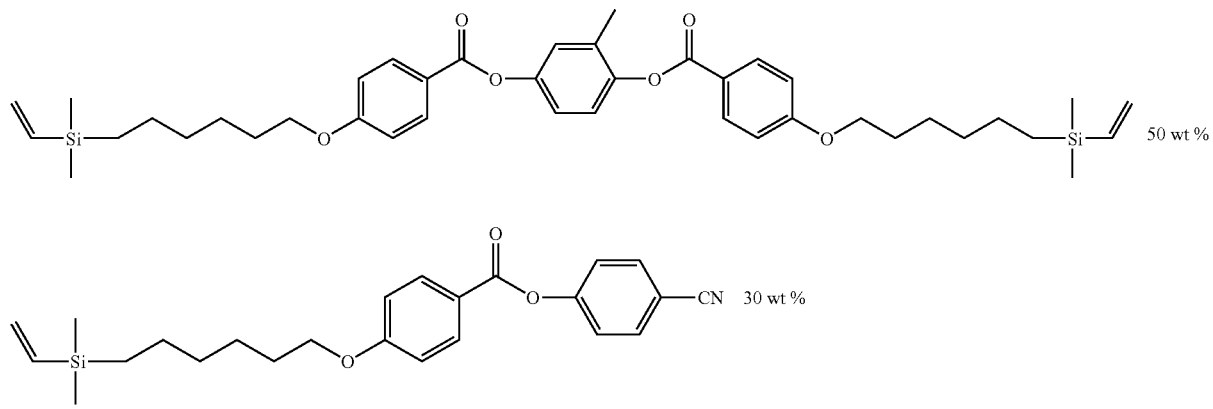

-continued

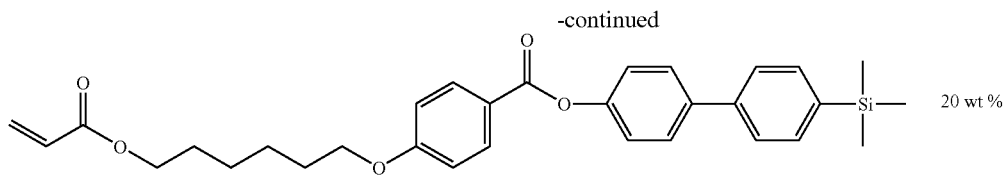
20 wt %

EXAMPLE 9

Manufacture of +C Type Compensation Film

First, 9.28 g of the liquid crystal composition 1 according to Example 6 was dissolved in 15 g of toluene and 15 g of xylene. Then, 600 mg of Irgacure 907, 40 mg of FC-4430 and 80 mg of BYK-300 were added thereto and the reaction mixture was shaken sufficiently. After completely dissolving the materials, particles were removed by using a particle filter. The resultant solution was bar-coated onto an oriented COP (cycloolefin polymer) having a thickness of 80 μm and treated with an aligning layer by using a wire bar. The coated product was dried in an oven at 50° C. for 1 minute, and UV rays (200~80 W/m) were irradiated thereto to provide a +C type compensation film.

EXAMPLE 10

Manufacture of +C Type Compensation Film

A +C type compensation film was manufactured in the same manner as described in Example 9, except that Liquid Crystal Composition 2 according to Example 7 was used instead of Liquid Crystal Composition 1 according to Example 6.

EXAMPLE 11

Manufacture of +C Type Compensation Film

A +C type compensation film was manufactured in the same manner as described in Example 9, except that Liquid Crystal Composition 3 according to Example 8 was used instead of Liquid Crystal Composition 1 according to Example 6.

COMPARATIVE EXAMPLE 1

Manufacture of +C Type Compensation Film

A +C type compensation film was manufactured in the same manner as described in Example 9, except that Merck RM257 was used instead of Liquid Crystal Composition 1 according to Example 6. After drying the coating layer, a dewetting phenomenon occurred. Also, a white turbid non-uniform film was formed after curing.

Determination of Physical Properties of Compensation Films

Each of the +C type compensation films according to Examples 9~11 was determined for its thickness and refraction index.

More particularly, the film coatability was evaluated by using a polarizing microscope and the film thickness was measured by using a micro-gauge. Also, the birefringence index was measured at an wavelength of 550 nm by using an Abbe refractometer. The results are shown in the following Table 1.

TABLE 1

| Compensation Film | Thickness (um) | In-plane refraction index ($n_{xy}$) | Out-of-plane refraction index ($n_z$) | Birefringence index ($\Delta n$) |
|---|---|---|---|---|
| Ex. 9 | 1 | 1.488 | 1.644 | 0.156 |
| Ex. 10 | 1 | 1.486 | 1.625 | 0.139 |
| Ex. 11 | 1 | 1.485 | 1.604 | 0.119 |

As can be seen from Table 1, the compensation films obtained by using the liquid crystal composition comprising the silicon derivative according to the present invention have excellent film coatability, allow the formation of a transparent film after curing, and show uniform film appearance with a birefringence index ($\Delta n$) of 0.156~0.119.

INDUSTRIAL APPLICABILITY

As can be seen from the foregoing, the novel silicon derivative according to the present invention and the liquid crystal composition comprising the same have high refractive anisotropy characteristics. Additionally, a high-quality view angle compensation film, which improves a contrast ratio measured at a tilt angle when compared to a contrast ratio measured from the front surface and minimizes color variations in a black state depending on view angles, can be fabricated by using the liquid crystal composition according to the present invention.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. A silicon derivative represented by the following Formula 1:

[Formula 1]

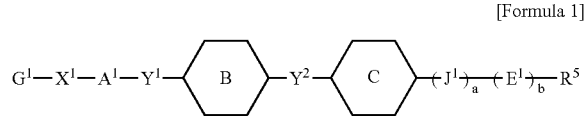

wherein $G^1$ is

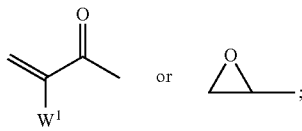

$W^1$ represents —H, —CH$_3$, —CH$_2$CH$_3$, —F, —Cl, —Br or —CF$_3$;

$X^1$ is —O—, —NH— or —(CH$_2$)$_m$—, and m is an integer of 0~5;

$A^1$ is a C$_1$~C$_{12}$ alkylene, C$_2$~C$_{12}$ alkenylene, —(CH$_2$CH$_2$O)$_n$—, —(CH$_2$CHCH$_3$O)$_n$— or —(CHCH$_3$CH$_2$O)$_n$—, and n is an integer of 1~5;

each of $Y^1$ and $Y^2$ independently represents —O—, —NH—, —(CH$_2$)$_p$—, —CH═CH—, —C≡C—, —C(═O)O—, —OC(═O)—, —C(═O)—, —SiH$_2$—, —SiMe$_2$—, —SiEt$_2$-, —CH$_2$SiH$_2$—, —CH$_2$SiMe$_2$—, —CH$_2$SiEt$_2$-, —SiH$_2$CH$_2$—, —SiMe$_2$CH$_2$— or —SiEt$_2$CH$_2$—, and p is an integer of 0~2;

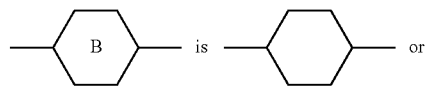

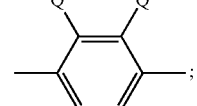

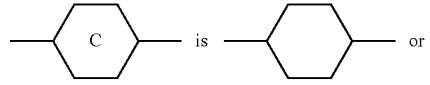

$J^1$ is —CH$_2$SiH$_2$—, —CH$_2$SiMe$_2$-, —CH$_2$SiEt$_2$-, —SiH$_2$CH$_2$—, —SiMe$_2$CH$_2$— or —SiEt$_2$CH$_2$—;

$E^1$ is

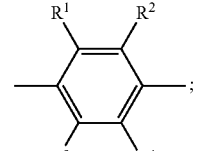

-continued

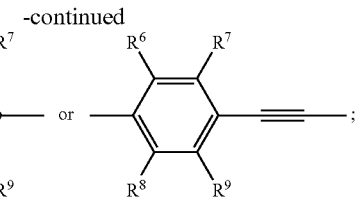

each of a and b independently represents an integer of 0~2;

each of $Q^1$~$Q^4$, $R^1$~$R^4$ and $R^6$~$R^9$ independently represents —H, —F, —Cl, —Br, —I, —CN, —OH, —CH$_3$, —CH$_2$CH$_3$ or —C(═O)CH$_3$; and $R^5$ is —SiMe$_3$, —SiEt$_3$, —SiF$_3$, —H, —F, —Cl, —Br, —I, —CF$_3$, —CN, —OH, —OCH$_3$, —OCH$_2$CH$_3$, —OCF$_3$, a C$_1$~C$_{12}$ alkyl or a C$_2$~C$_{12}$ alkenyl;

with the proviso that the compound of Formula 1 has at least one —Si—.

2. A silicon derivative represented by the following Formula 2:

[Formula 2]

wherein each of $G^1$ and $G^2$ independently represents

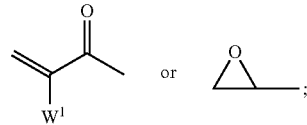

$W^1$ represents —H, —CH$_3$, —CH$_2$CH$_3$, —F, —Cl, —Br or —CF$_3$;

each of $X^1$ and $X^2$ independently represents —O—, —NH— or —(CH$_2$)$_m$—, and m is an integer of 0~5;

each of $A^1$ and $A^2$ independently represents a C$_1$~C$_{12}$ alkylene, C$_2$~C$_{12}$ alkenylene, —(CH$_2$CH$_2$O)$_n$—, —(CH$_2$CHCH$_3$O)$_n$— or —(CHCH$_3$CH$_2$O)$_n$—, and n is an integer of 1~5;

each of $Y^1$~$Y^4$ independently represents —O—, —NH—, —(CH$_2$)$_p$—, —CH═CH—, —C≡C—, —C(═O)O—, —OC(═O)—, —C(═O)—, —SiH$_2$—, —SiMe$_2$—, —SiEt$_2$—, —CH$_2$SiH$_2$—, —CH$_2$SiMe$_2$-, —CH$_2$SiEt$_2$-, —SiH$_2$CH$_2$—, —SiMe$_2$CH$_2$— or —SiEt$_2$CH$_2$—, and p is an integer of 0~2;

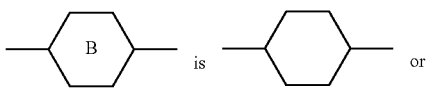

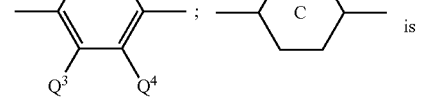

-continued

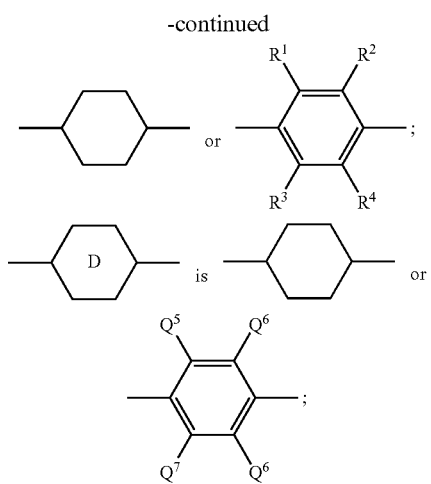

each of $J^1$ and $J^2$ independently represents —CH$_2$SiH$_2$—, —CH$_2$SiMe$_2$-, —CH$_2$SiEt$_2$-, —SiH$_2$CH$_2$—, —SiMe$_2$CH$_2$— or —SiEt$_2$CH$_2$—;

each of $E^1$ and $E^2$ independently represents

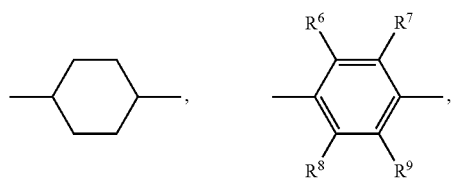

-continued

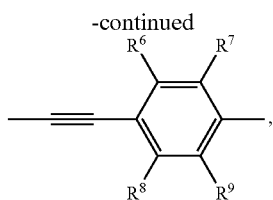

each of a, b, c and d independently represents an integer of 0~2; and each of $Q^1$~$Q^8$, $R^1$~$R^4$ and $R^6$~$R^9$ independently represents —H, —F, —Cl, —Br, —I, —CN, —OH, —CH$_3$, —CH$_2$CH$_3$ or —C(=O)CH$_3$;

with the proviso that the compound of Formula 2 has at least one —Si—.

3. The silicon derivative according to claim 1, wherein the C$_2$~C$_{12}$ alkenylene as $A^1$ is —CH=CH—, —CH=CCH$_3$—, —CH$_2$CH=CH—, —CH=CHCH$_2$CH$_2$—, —CH$_2$CH=CHCH$_3$—, —CH$_2$CH$_2$CH=CH—, —CH=CHCH$_2$CH$_2$CH$_2$—, —CH$_2$CH=CHCH$_2$CH$_2$—, —CH$_2$CH$_2$CH=CHCH$_2$—, or —CH$_2$CH$_2$CH$_2$CH=CH—;

and the C$_2$~C$_{12}$ alkenyl as $R^5$ is —CH=CH$_2$, —CH=CHCH$_3$, —CH$_2$CH=CH$_2$, —CH=CHCH$_2$CH$_3$, —CH$_2$CH=CHCH$_3$, —CH$_2$CH$_2$CH=CH$_2$, —CH=CHCH$_2$CH$_2$CH$_3$, —CH$_2$CH=CHCH$_2$CH$_3$, —CH$_2$CH$_2$CH=CHCH$_3$, or —CH$_2$CH$_2$CH$_2$CH=CH$_2$.

4. The silicon derivative according to claim 2, wherein each of the C$_2$~C$_{12}$ alkenylene as $A^1$ and $A^2$ independently represents —CH=CH—, —CH=CCH$_3$—, —CH$_2$CH=CH—, —CH=CHCH$_2$CH$_2$—, —CH$_2$CH=CHCH$_2$—, —CH$_2$CH$_2$CH=CH—, —CH=CHCH$_2$CH$_2$CH$_2$—, —CH$_2$CH=CHCH$_2$CH$_2$—, —CH$_2$CH$_2$CH=CHCH$_2$—, or —CH$_2$CH$_2$CH$_2$CH=CH—.

5. The silicon derivative according to claim 1, which has stereoisomers and the stereoisomers are present in a ratio of [trans-isomer:cis-isomer] of 85:15~100:0.

6. The silicon derivative according to claim 2, which has stereoisomers and the stereoisomers are present in a ratio of [trans-isomer:cis-isomer] of 85:15~100:0.

7. A liquid crystal composition comprising at least one silicon derivative selected from the group consisting of the silicon derivative represented by the following Formula 1 and the silicon derivative represented by the following Formula 2:

[Formula 1]

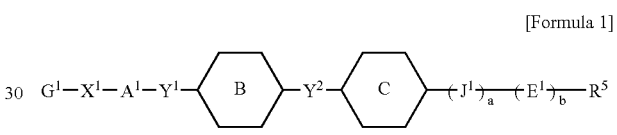

wherein $G^1$, $X^1$, $A^1$, $Y^1$, $Y^2$, ring B, ring C, $J^1$, $E^1$, a, b and $R^5$ are the same as defined in claim 1; and

[Formula 2]

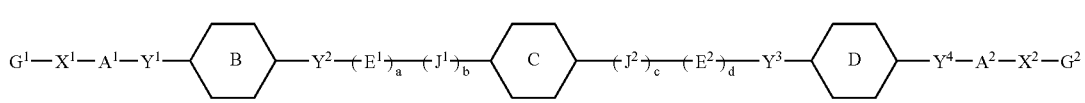

wherein $G^1$, $G^2$, $X^1$, $X^2$, $A^1$, $A^2$, $Y^1$~$Y^4$, ring B, ring C, ring D, $J^1$, $J^2$, $E^1$, $E^2$, a, b, c and d are the same as defined in claim 2.

8. The liquid crystal composition according to claim 7, wherein each silicon derivative contained in the liquid crystal composition is used in an amount of 1~80 wt% based on the total weight of the composition.

9. A compensation film for liquid crystal display device, which comprises the liquid crystal composition as defined in claim 7.

10. The compensation film for liquid crystal display device according to claim 9, wherein each silicon derivative contained in the liquid crystal composition is used in an amount of 1~80 wt% based on the total weight of the composition.

11. The compensation film for liquid crystal display device according to claim 9, which is an A-plate type compensation film, a B-plate type compensation film, a (+)C-plate type compensation film, or a (−)C-plate type compensation film.

* * * * *